United States Patent [19]

Bohler

[11] Patent Number: 4,804,070
[45] Date of Patent: Feb. 14, 1989

[54] LOCKABLE VEHICLE WHEEL CHOCK DEVICE

[76] Inventor: Gerard M. Bohler, R.D. #2, Box 528, Pine Grove, Pa. 17963

[21] Appl. No.: 226,119

[22] Filed: Jul. 29, 1988

[51] Int. Cl.$^4$ ............................................... B60T 3/00
[52] U.S. Cl. ......................................... 188/32; 70/14; 70/18; 70/225; 70/226; 410/30
[58] Field of Search .............................. 188/32, 36–37, 188/62; 70/225, 226, 227, 228, 14, 18, 19, 31, 53; 410/30, 49, 42; D12/217

[56] References Cited

U.S. PATENT DOCUMENTS

| D. 223,771 | 6/1972 | Roney Jr. | D12/217 |
|---|---|---|---|
| 354,010 | 12/1886 | Black | 188/32 |
| 472,997 | 4/1892 | Hayward | 188/32 |
| 1,174,410 | 3/1916 | Hajasok et al. | 188/32 |
| 2,442,501 | 6/1948 | Mast et al. | 188/32 |
| 2,475,111 | 7/1949 | Ridland | 188/32 |
| 3,537,548 | 11/1970 | Jeppesen | 188/32 |
| 3,581,846 | 6/1971 | Janus | 188/32 |
| 3,687,238 | 8/1972 | Carpenter | 188/32 |
| 4,031,726 | 6/1977 | De Jager | 188/32 X |
| 4,649,724 | 3/1987 | Raine | 70/226 |

FOREIGN PATENT DOCUMENTS

| 660032 | 2/1965 | Belgium | 188/32 |
|---|---|---|---|
| 3322973 | 1/1985 | Fed. Rep. of Germany | 188/32 |
| 897582 | 5/1962 | United Kingdom | 188/32 |
| 947541 | 1/1964 | United Kingdom | 188/32 |

Primary Examiner—Douglas C. Butler
Attorney, Agent, or Firm—Kline, Rommel & Colbert

[57] ABSTRACT

An improved vehicle locking wheel chock comprising a pair of wedge shaped chocks having flat bottom ground contacting surfaces each rigidly affixed to respective end portions of a spacing bar with the chock bottom surfaces in a coplanar relationship and the oblique wedge surfaces of the respective chocks in a facing relationship spaced apart a distance that the space between the respective chock oblique wedge surfaces defines the region occupied by the vehicle wheel and tire. Each chock rotatably supports a lockable retaining mechanism comprising a support rod extending transversely of the chock with a pair of elongated retaining arms rigidly affixed to opposite ends of the rod to extend transversely of the rod axis and spaced apart a distance exceeding the width of a vehicle wheel and tire. Each rod is pivotally supported by a chock for rotation about the longitudinal axis of the rod between an open position in which both retaining arms lie outside the face of the wheel region space defined between the oblique wedge surfaces of the respective chocks and a closed position in which both retaining arms lie across the face of the wheel region space defined between the oblique wedge surfaces of the respective chocks. The outer ends of the retaining arms of both retaining mechanisms positioned on the same side of the pair of chocks being configured for being mutually coupled together when the retaining arms are in the closed position.

8 Claims, 2 Drawing Sheets

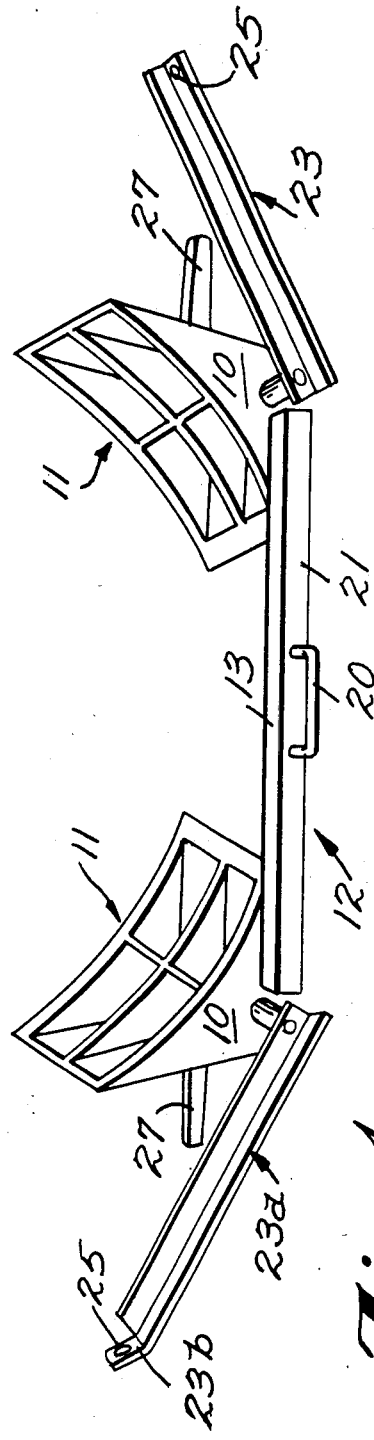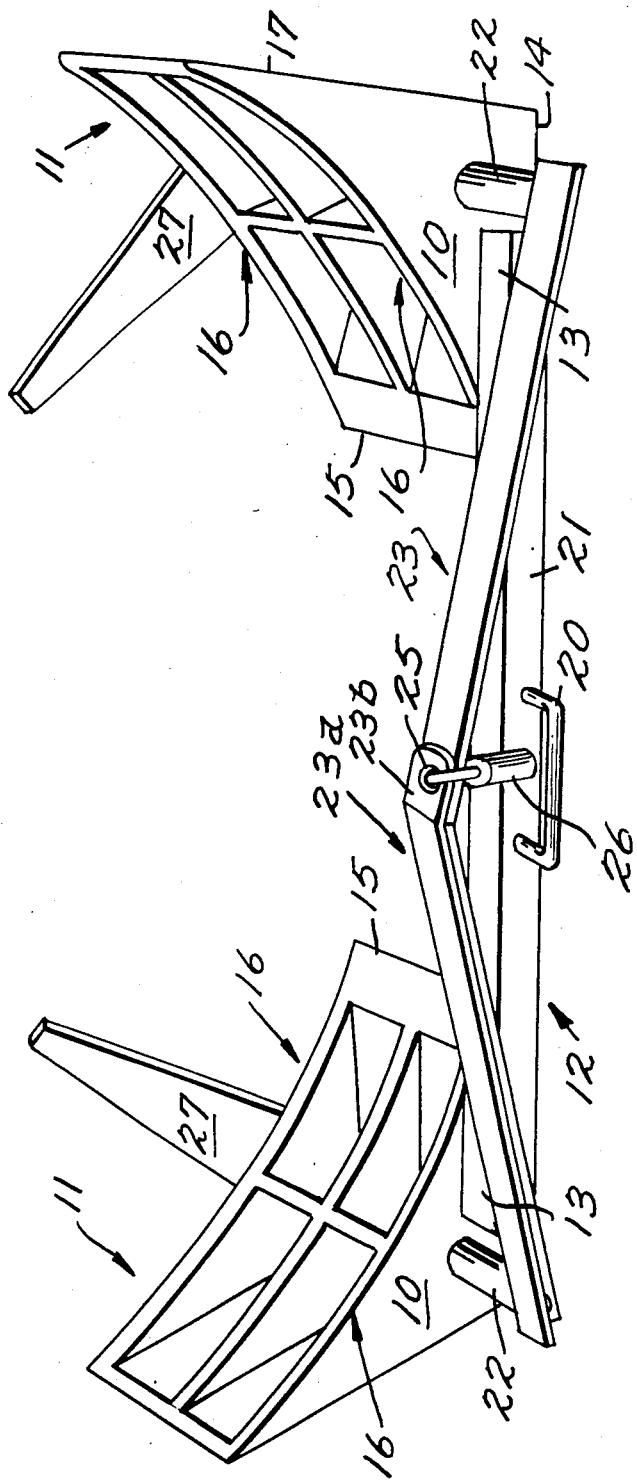

LOCKABLE VEHICLE WHEEL CHOCK DEVICE

BACKGROUND OF THE INVENTION

The present invention relates to a new and simplified improvement in a vehicle wheel chock device that can be easily installed and positively locked into place in front of and behind of the wheel of a vehicle securing it against movement and preventing accidental or intentional removal by unauthorized persons of the chocks.

Prior devices such as single and multiple simple chocks may be accidentally removed or dislodged and all known lockable chocking devices, such as those of U.S. Pat. Nos. 3,537,548, 3,581,846 and 3,687,238 are complex and heavy.

SUMMARY OF INVENTION

The invention utilizes a pair of light weight, conventional wedge shaped chocks that are connected together by a spacing bar affixed to the respective chocks maintaining them in a facing arrangement with the flat bottom surfaces of the chocks in a coplanar relationship and the sloping wedge faces of the respective chocks spaced apart a distance that the sloping chock wedge faces are substantially in contact with both sides of the tire mounted on the wheel of a vehicle, which general arrangement is utilized in various known chocking devices. The novel aspect of the invention involves rotatable locking devices pivotally supported by each of the pair of connected chocks in which retaining arms of the locking devices can be rotated to an open position in which the chocks can be inserted into place on each side of the vehicle wheel and then rotated to and locked into a closed position in which the arms of the locking devices prevent removal of the chocks from around the vehicle wheel. Each locking device comprises a pair of elongated arms rigidly affixed to opposite ends of a support rod that extends transversely through each chock with each of the pair of arms extending outwardly transversely of the rod axis and separated by a distance exceeding that of the width of the vehicle tire and wheel. Each support rod is journaled within a chock for rotation of the locking device about the rod axis with the respective arms of each locking device angularly arranged with respect to one other such that upon rotation of the locking devices away from the hub of the vehicle to an open position both retaining arms of each locking device lie outside the face of the region between the respective facing chock wedge surfaces occupied by the vehicle wheel and tire and, upon rotation of the locking devices toward the hub of the wheel to a closed position, both retaining arms of each locking device lie across the face of the region between the respective facing chock wedge surfaces occupied by the vehicle wheel and tire. The front arms of the respective locking devices that are located on the exterior side of the vehicle wheel have outer end portions configured to establish mating contact with each other in the closed position with the respective external arms and the bottom surfaces of the chocks subtending an acute angle, thereby retaining the locking devices in the closed position with the mating surfaces of the external arms several inches vertically above the road surface. The locking devices can conveniently be locked in the closed position by passing the shackle of a padlock through registering holes in the respective mating surfaces of the two external locking arms, the front arms and oppositely located rear arms of the locking device lying across the face of the vehicle wheel and tire preventing removal of the chocking device.

The primary object of the invention is to provide a simple, inexpensive and light vehicle chocking device which can be locked into place to prevent unintentional removal.

A further object of the invention is to provide a lockable chocking device which can be easily installed or removed with little physical effort.

Still a further object of the invention is to provide a locking chock device in which the device lock is easily accessible and clear of mud or snow that might be on the road surface.

Other and further objects and advantages of the invention would be readily apparent to those skilled in the art upon referring to the following detailed description in connection with the accompanying drawings in which like reference numerals designate like parts.

BRIEF DESCRIPTION OF THE DRAWINGS

FIG. 1 is a perspective front elevation view of the chock device in a closed and locked position.

FIG. 2 is a perspective front elevation view of the chock device in an open position.

DESCRIPTION OF A PREFERRED EMBODIMENT

Figure 4:
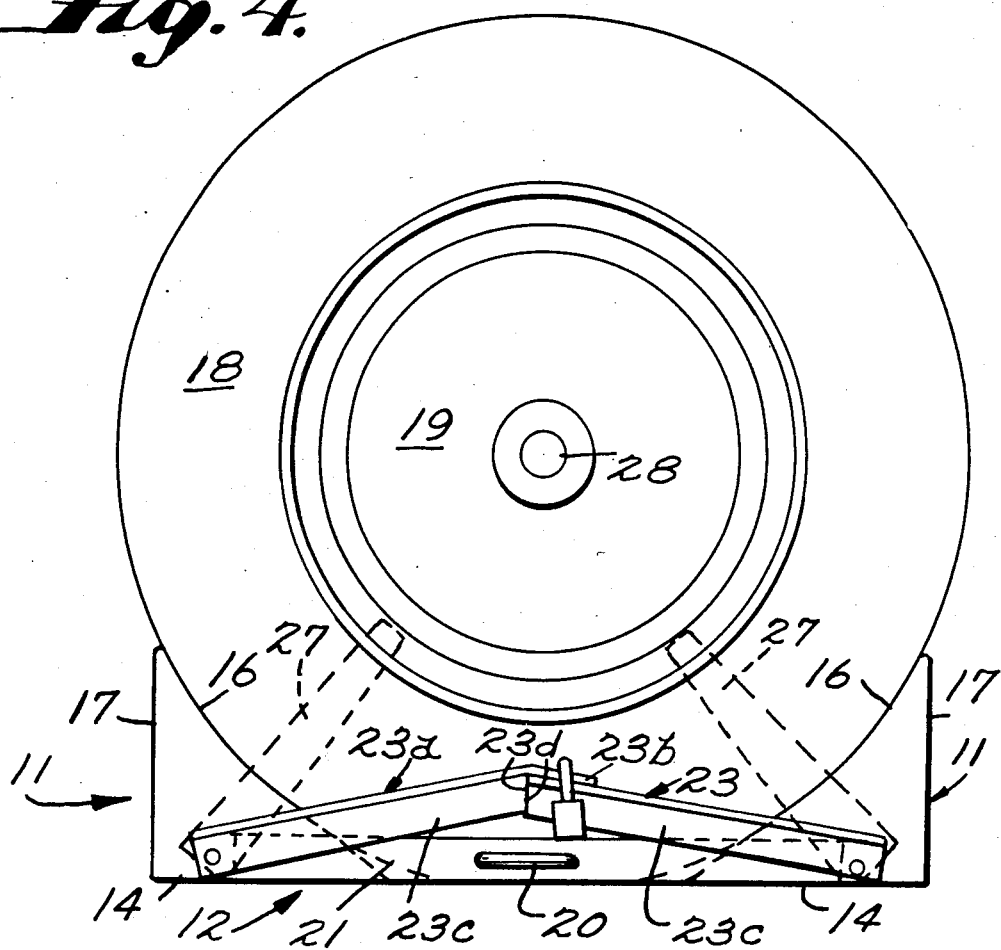
FIG. 4 is a front elevation of the device of FIG. 1 in a closed and locked position installed on the wheel of a vehicle.

As best seen in FIGS. 1 and 2, a front side face 10 of each of a pair of wedge shaped chocks 11 is rigidly affixed to the front edge at opposite ends of the upper flange 13 of an elongated L flanged spacing bar 12 by welding or similar means. The side elevation contour of each chock is that of a conventional, generally triangular wedge having a flat lower surface 14 for contacting the road surface and from the front pointed end 15 of which an upwardly sloping tire contacting area 16 extends obliquely to the upper end of the vertically extending rear surface 17 of the chock, the contour of the oblique front wedge surface 16 preferably conforming to that of the perimeter of a tire 16 mounted on a vehicle wheel 19. A handle 20 extending outwardly from the front flange 21 of the spacing bar 12 is provided for convenient insertion and removal of the chocking device. The flanged spacing bar of the illustrated embodiment is a solid bar with end portions welded to respective chock side faces but obviously could be of multipiece construction with end portions that are slideably adjustable to vary the distance between chocks or each chock could be slideably affixed to the respective ends of a solid spacing bar to permit the spacing between the chock oblique wedging surfaces to be adjusted to accommodate different size vehicle wheels.

In order to provide a light weight chock that is of sufficient strength and yet may be easily handled, my improved chock may be constructed of extruded aluminum.

Figure 3:
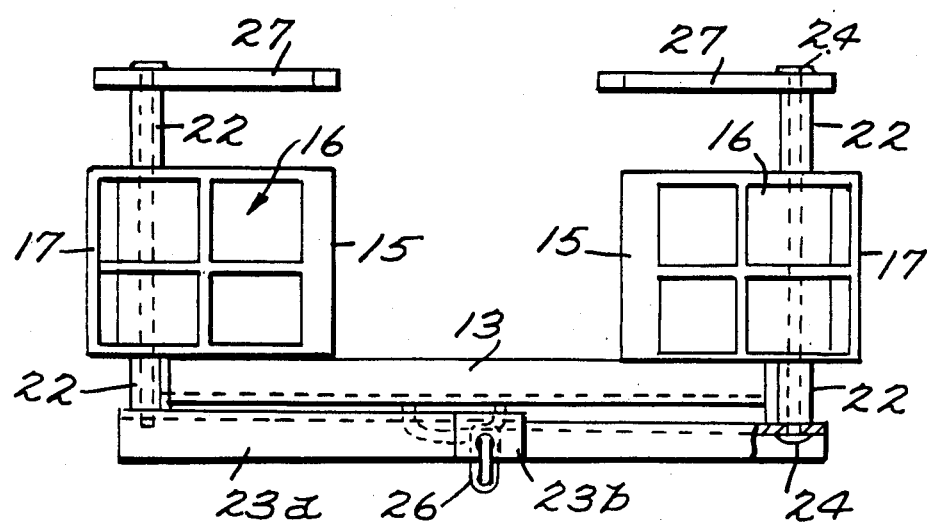
FIG. 3 is a plan view from above of the chock device in a closed and locked position.

A retaining arm support rod 22 extends transversely of and is journaled within each chock 11 for rotation of the rod about its longitudinal axis. As best seen in FIG. 2, a lower end of each of an elongated L flanged lockable front retaining arm 23 and 23a is affixed by a cap 24 or other means to that end of the respective support rods 22 that extend externally of the front side faces 10 of the chocks 11 to which the spacing bar 12 is affixed. As best seen in FIG. 1 the front retaining arm 23a differs from the other lockable front retaining arm 23 only in that the outer flange end portion of one front retaining arm 23a has an acutely angled extension 23b that overlies the straight outer flange end portion of the other front retaining arm 23 when both front retaining arms are in the closed position illustrated in FIGS. 1, 3 and 4 as will be subsequently more fully discussed. The outer top flange end portions of the front retaining arms 23 and 23a have holes 25 that register when the arms are in the closed position of FIG. 1 and through which the shackle of a padlock 26 may be inserted. The lower end of each of the two rear retaining arms 27 is affixed by a cap 24 or other means to that end of each of the two support rods 22 that is opposite the ends to which the lockable front retaining arms 23 and 23a are affixed, the spacing between the respective front retaining arms 23 and 23a and the rear retaining arms 27 affixed at the respective ends of the support rods exceeding that of the width of the tire 18 and wheel 19. The spacing bar 12, support rods 22, the locking arms 23 and 23a and the retaining arms 27 preferably are also of an aluminum alloy to minimize weight and to prevent sparking from contact with a hard surface.

The angular relationship between the front retaining arms 23 and 23a and the respective rear retaining arms 27 affixed at each end of the two support rods 22 is such that rotation of each of the sets of front and rear retaining arms away from the area between the facing angled wedge surfaces 16 of the pair of chocks 11 to an open position in which both retaining arms 27 contact the ground as in FIG. 2, both sets of front and rear retaining arms lie outside the face of the region between the angled wedge surfaces 16 of the pair of connected chocks 11 which would be occupied by the lower portion of the vehicle wheel and tire, thereby permitting the chocking device to be positioned in the chocking position with the pair of chocks on opposite sides of the vehicle tire 18. In the illustrated, preferred embodiment the angular relationship between the front and the rear retaining arms, when rotated toward the area between two chock wedging surfaces 16 to the closed position of FIGS. 1 and 4, is such that both rear retaining arms 27 extend in the general direction of the vehicle wheel hub 28 with the lockable front retaining arms 23 and 23a overlying and subtending an acute angle with the spacing bar 12. In the closed position both sets of retaining arms, 23 and 27 and 23a and 27, extend across the face of the region between the chock angled wedging surfaces 16 with the angled end extension portion 23b of the one front retaining arm 23a overlapping the straight outer end portion of the other front retaining arm 23 and the overlapping end portions of the front retaining arms a short distance above the ground clear of any mud or snow that might have accumulated on the ground. The respective outer edge surfaces 23d of the vertical flange portions 23c of the front retaining arms 23 and 23a are complementarily angled as to come into contact when the retaining arms reach the closed position shown in FIG. 4. The angular relationship between the front and rear retaining arms of each set of locking devices obviously can vary from that of the illustrated, preferred embodiment, the critical criteria being that the front and rear retaining arms of both sets of locking devices lie outside the region between the chock wedge surfaces when in the open position and lie across the face of the region between the chock wedge surfaces when in the closed position with the overlapping ends of the front lockable retaining arms at a convenient height above the ground. Insertion of the shackle of the padlock 26 through the holes 25 in the end portions of the front retaining arms 23 and 23a positively locks the front arms 23 and 23a and the respective rear retaining arms 27 into the closed position preventing accidental or intentional rotation by unauthorized persons of the chock retaining arms to the open position at which the chocking device can be removed.

It should be understood that the foregoing disclosure relates only to a preferred embodiment of the invention and that numerous modifications or alterations may be made without departing from the spirit and scope of the invention as set forth in the following claims.

I claim:

1. A vehicle wheel locking chock comprising a pair of wedge shaped chocks each having a bottom surface adapted to rest on the ground and from a pointed forward end of which a vertically oblique wedge surface adapted to contact the perimeter of a vehicle tire extends rearwardly between chock side surfaces to an upper portion of the rear end surface of the chock, spacing bar means affixed to each said chock for interconnecting said pair of chocks with said chock bottom surfaces in a substantially coplanar relationship and the respective oblique wedge surfaces of said pair of chocks in a facing relationship spaced apart at a distance such that the space between said respective chock wedge surfaces defines a region to be occupied by a lower portion of a vehicle tire, an elongated support rod extending transversely of each chock between said side surfaces, first and second elongated arms rigidly affixed to opposite ends of each said support rod exteriorly of a chock side surface to extend outwardly and transversely of the longitudinal axis of said rod, and means rotatably supporting each said rod for rotation about its longitudinal axis between an open position in which said first and second arms extend outside the face of said space between said chock oblique wedge surfaces defining said tire region and a closed position in which said first and second arms extend across the face of said space between said chock oblique wedge surfaces defining said tire region.

2. The locking chock of claim 1 wherein said spacing bar means has end portions each connected to a respective chock side face on the same side of each chock on which said first arms are located.

3. The locking chock of claim 2 wherein the outer end portions of the respective ones of said first arms are configured to establish mating contact with each other when said arms are rotated to said closed position.

4. The locking chock of claim 3 wherein said first arms and said chock bottom surfaces subtend an acute angle when said arms are in said closed position.

5. The locking chock of claim 4 wherein said outer end portions of the respective first arms have flat surfaces adapted to adjoiningly over when said arms are in said closed position and said flat surfaces are adapted for attachment of a locking means.

6. The locking chock of claim 5 wherein said first arm flat surfaces respectively contain a hole that are in registration when said arms are in said closed position, said holes being adapted for insertion of a lock.

7. A vehicle wheel locking chock comprising a pair of wedge shaped chocks each having a substantially flat bottom surface adapted to rest on the ground and from a pointed forward end of which a vertically oblique wedge surface adapted to contact the perimeter of a vehicle tire extends rearwardly between chock side surfaces to an upper portion of the rear and the surface of the chock, spacing bar means attached to each said chock for interconnecting said pair of chocks with said chock bottom surfaces in a coplanar relationship and the respective oblique wedge surfaces of said pair of chocks in a facing relationship spaced apart a distance that the space between said respective chock wedge surfaces defines the region occupied by a lower portion of a vehicle tire, and a locking device rotatably supported from each said respective chock for rotation between an open position and a closed position, each said locking device comprising a front and a rear retaining arm rigidly affixed to opposite ends of an elongated support rod, said rod extending transversely of a respective chock between chock side faces and supported for rotation about the rod longitudinal axis between said device open and closed positions, each said front and rear retaining arm extending outwardly and transversely of said rod longitudinal axis with the angular relationship between said front and rear retaining arms of each device being such that rotation of said rod in a direction away from the space between the respective chocks to said open position positions said front and rear retaining arms to extend outside the face of said space between said chock oblique wedge surfaces defining said tire region and rotation of each said rod in a direction toward the space between the respective chocks to said closed position positions said front and rear retaining arms to extend across the face of said space between said chock oblique wedges surfaces defining said tire region, the outer end portions of the respective front arms of said devices being configured to establish mating contact with each other when rotated from said open to said closed positions.

8. The locking chock of claim 7 wherein said spacing bar means has end portions each connected to a respective chock side face on which said front arms are located.

* * * * *